United States Patent
Kelly (10) Patent No.: US 8,089,256 B2
(45) Date of Patent: Jan. 3, 2012

(54) MULTIPHASE SWITCHING CONVERTER

(75) Inventor: Anthony Kelly, Kildimo (IE)

(73) Assignee: Powervation Ltd., Castletroy, Limerick (IE)

( * ) Notice: Subject to any disclaimer, the term of this patent is extended or adjusted under 35 U.S.C. 154(b) by 268 days.

(21) Appl. No.: 12/249,854

(22) Filed: Oct. 10, 2008

(65) Prior Publication Data

US 2010/0090670 A1    Apr. 15, 2010

(51) Int. Cl.
*G05F 1/575* (2006.01)
*G05F 1/59* (2006.01)

(52) U.S. Cl. .......................... 323/283; 323/272

(58) Field of Classification Search .............. 323/225, 323/271, 272, 283

See application file for complete search history.

(56) References Cited

U.S. PATENT DOCUMENTS

| 6,222,745 B1* | 4/2001 | Amaro et al. | 363/65 |
| 7,245,512 B2* | 7/2007 | Leung et al. | 363/95 |

* cited by examiner

*Primary Examiner* — Gary L Laxton
(74) *Attorney, Agent, or Firm* — Hickman Palermo Truong & Becker LLP (57) ABSTRACT

A method of passive current balancing for digital control of multiphase DC-DC converters is provided based upon the duty-cycle matching principle. Current balance is achieved by inserting a digital filter into the control path. Being sensorless, it is insensitive to current measurement inaccuracies caused by noise, component value tolerance or variation. It will be shown that effective current balancing can be achieved via some simple modifications to standard voltage mode control laws, allowing current balancing to be achieved with minor additional complexity. The current share scheme has been shown to perform well dynamically, matching currents cycle by cycle during load steps, and clearly benefiting from the absence of the slow current share loop popular in traditional methods. The current share filter proposed, blends well with existing digital controllers. Given the very low complexity in implementing the filter, the degree of matching achieved is exceptional.

21 Claims, 7 Drawing Sheets

MULTIPHASE SWITCHING CONVERTER

FIELD OF THE APPLICATION

The present application relates to the field of multiphase switching power supplies and in particular to methods of balancing the currents in the phases.

BACKGROUND

Current sharing is required in multiphase power converters in order to ensure that the individual phases of the power converter share currents in a predetermined fashion. Usually the phase currents are equalized, but alternative arrangements are known.

Voltage mode control alone is generally understood as not being sufficient to achieve current sharing because the inductor currents are not explicitly controlled. Imperfect matching between phases of the power-train leads to unmatched inductor currents which seriously impacts converter performance reliability and efficiency.

There are many methods of current sharing in DC-DC conversion. Of these, current sharing methods which measure inductor current in each phase and actively balance the currents using a control loop are popular. Methods of current sharing include the introduction of a current control loop in addition to the voltage control loop. Of these, average and peak current mode control loops are popular choices. However, the bandwidth of the current control loop is a concern. The current loop can only match the impedances of the individual phases up to the current share loop bandwidth, which is typically much less than the control loop bandwidth, but the current share bandwidth needs to be large for high performance control.

Furthermore the voltage and current control loops can interact, which may limit achievable voltage loop bandwidth and cause stability problems. As such, an effective current share scheme involves a trade-off between the high bandwidth requirement for accurate matching of the phases but low bandwidth in order to avoid undesired interactions between the control loops which affects stability and voltage loop performance.

Although current share loops based on current mode control are popular, current measurement accuracy is a concern, and these techniques are difficult to reproduce in digital power controllers because of the demands placed on the current sampling ADC (Analog to Digital Converter).

Figure 1:
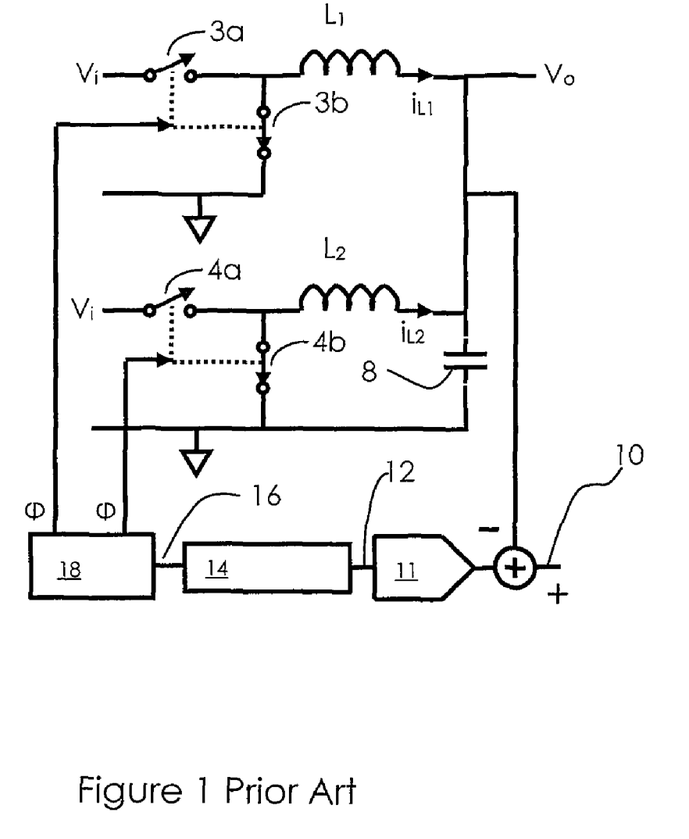
FIG. 1 is a typical example of a known multiphase converter.
Figure 2:
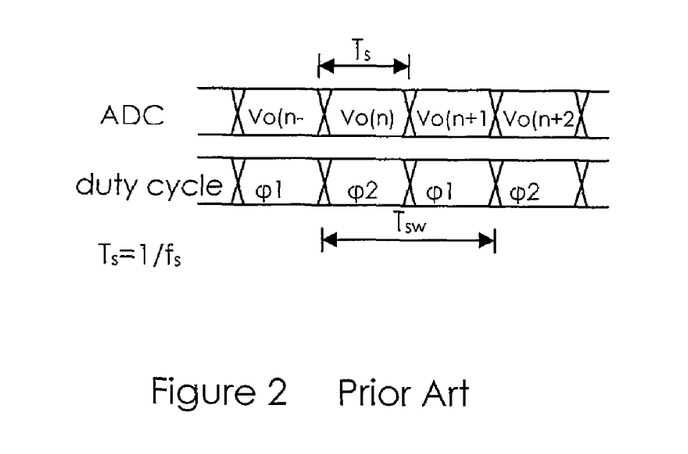
FIG. 2 is timing diagram showing the relationship between a sampled error signal and phase control signals for the converter of FIG. 1.

Accordingly, passive current sharing techniques such as duty cycle matching are desirable as this technique shares the currents between the phases in a manner which minimizes overall power loss associated with resistive phase current imbalance, hence improving efficiency over other current share methods. Additionally, there are no stability concerns arising from the presence of multiple control loops. An example of a two phase duty cycle matching circuit for converting an input voltage ($V_i$) to an output voltage ($V_o$) is shown in FIG. 1. In this circuit, each phase is arranged as a buck converter. The buck converter which will be familiar to those skilled in the art, has an inductor $L_1$, $L_2$ which is switchably connected at a first end by a switching arrangement $3_{a-b}$, $4_{a-b}$ to either an input voltage $V_i$ or ground. The opposite ends of the inductors are connected to a common capacitor 8. In the exemplary circuit shown, the buck converter is a synchronous buck converter with each phase employing two switches $3_{a-b}$, $4_{a-b}$. It will be appreciated that the circuit may also be operated in a non-synchronous form in which the second switch $3b$, $4b$ in each switching arrangement is replaced with a diode. The output voltage $V_o$ is compared to a desired set point 10 and sampled by an Analog to Digital Converter 11 to produce a digital error signal 12. The error signal in turn is fed to a compensator\controller 14. The controller is responsive to the error signal to provide a control signal 16. The controller may for example be a PID controller. The controller may include a low pass filter to reduce the effects of noise. The control signal identifies a value for the duty cycle of the phases. The control signal in turn is supplied to a Digital Pulse Width Modulator (DPWM) 18 which generates switching signals $\phi_1$, $\phi_2$ for the switching arrangements of the individual phases. In operation, the switching signals for the individual phases are staggered as shown in FIG. 2. The DPWM is trailing edge modulated, so during operation each phase operates at the switching frequency, with their rising edges being 50% out of phase. Thus in the case of the two phase circuit shown in FIG. 2, the duty cycle is set for one phase in one cycle and for the other cycle on the next. As a result the duty cycle of individual phases are not identical. The same duty cycle could be supplied to each phase but this would effectively halve the bandwidth of the controller.

Figure 3:
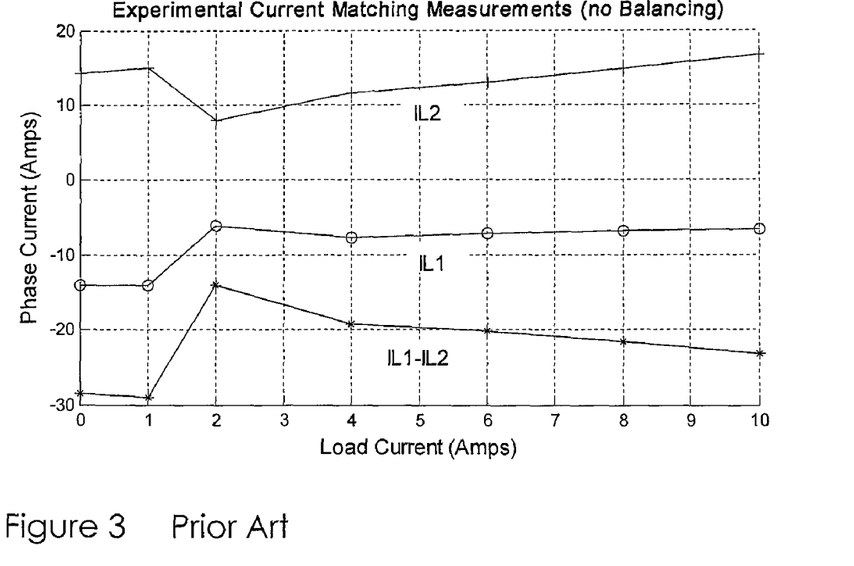
FIG. 3 represents experimental results for a converter of the type shown in FIG. 1.

Whilst it might be assumed that best efforts of matching impedances in the power train achieves inherent current matching, this is not the case and in fact in general does not equalize the phase currents, as shown in the experimental results of FIG. 3. It is clear from these experimental results that the current in the inductors of each phase ($I_{L1}$ and $I_{L2}$) are not equal and in fact the differences between the currents ($I_{L1}-I_{L2}$) is quite substantial.

Methods to implement the duty-cycle matching concept have been designed and tested. Although they have performed well, there is some calculation overhead involved in the algorithm of some of these that limits control performance by issuing the same duty cycle to each phase and in others duty cycle matching is only maintained approximately. Techniques that use a loop to keep the duty-cycles matched have associated stability and performance concerns.

SUMMARY

The present application provides a method of passive current balancing based upon the duty-cycle matching principle. However current balancing is achieved inherently with the net result that the controller is simple, inherently stable and does not require a current balance control loop.

DETAILED DESCRIPTION

The present application will now be explained with reference to the exemplary multiphase DC-DC converter of FIG. 4 (2-phases are shown for ease of explanation although it will be appreciated that several phases may be employed). The converter of FIG. 4 shares the same basic structure as that of FIG. 1 and thus common reference numerals refer to features\components common between the two circuits. In particular, it will be appreciated that it is the controller that has changed and that the topology of the converter remains unchanged. More particularly, the arrangement of FIG. 4 employs a filter 22 which filters the output signal from a controller 20. The filter-controller arrangement 20, 22 is effectively a replacement for the controller 14 of FIG. 1 and the purpose for which will become clear from the description below.

The method of the present application arises from the unlikely realization that disturbances in the control loop owing to phase mismatch will occur at the per phase switching frequency $f_{sw}$. These disturbances in turn will appear as differences on the duty cycle, leading to duty cycle mismatch. The present application employs a filter to reject this per phase switching frequency from the control loop, and in particular in the feedback\compensator path. Such a filter may be readily implemented for example as given by equation (1).

$$F(z) = 0.5 \cdot \frac{z+1}{z} \quad (1)$$

Figure 6:
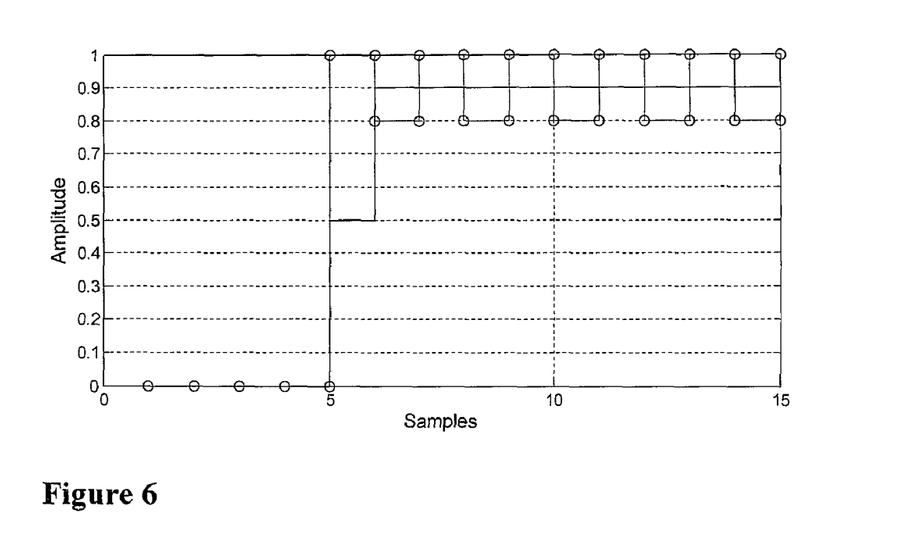
FIG. 6 illustrates the response of the Filter of FIG. 5 to a step input with an additional disturbance at the per-phase switching rate.

The filter described by equation (1) rejects differences between successive samples, thus rejecting duty cycle differences. The rejection properties of the filter F can be further understood by examining the time domain plot of FIG. 6 which illustrates the effect of a step input to the filter (dotted). The input has a disturbance at half the sample rate imposed immediately following the step. The filter's time output (full line) shows that the disturbance is completely rejected. It can be seen that the filter reacts to the step immediately but requires another sample to react fully. This introduces a small delay into the control loop (the group delay is equal to half a sample period). This small delay may, if required, be accounted for by the controller\compensator and does not adversely impact the loop's transient response.

Considering the magnitude versus frequency plot of F (the first order averager of FIG. 7 full line); the null at half the sample rate shows that duty cycle differences at the same frequency as the per-phase switching rate are rejected (half the sample rate).

Introducing the filter F of equation (1) into the loop rejects disturbances at $f_s/2$. Therefore disturbances relating to the phase mismatch are rejected and duty cycle matching is achieved.

It is worth noting that the notch filter rejects disturbances at $f_s/2$ regardless of how they originated, ensuring the duty cycle matching is robust against noise.

The notch filter rejects signals in the loop at the per phase switching rate ($f_s/2$), but not at sub-harmonics. Whilst not rejecting sub-harmonics (e.g. ½ or ¼) of the per-phase rate may be viewed as a potential drawback that might disturb the duty cycle matching. It has been realized that as the main mismatches occur as a function of the phases, the magnitude of sub-harmonic oscillations is small and including filtering to reject them, whilst possible, would yield only limited current balancing performance.

Figure 4:
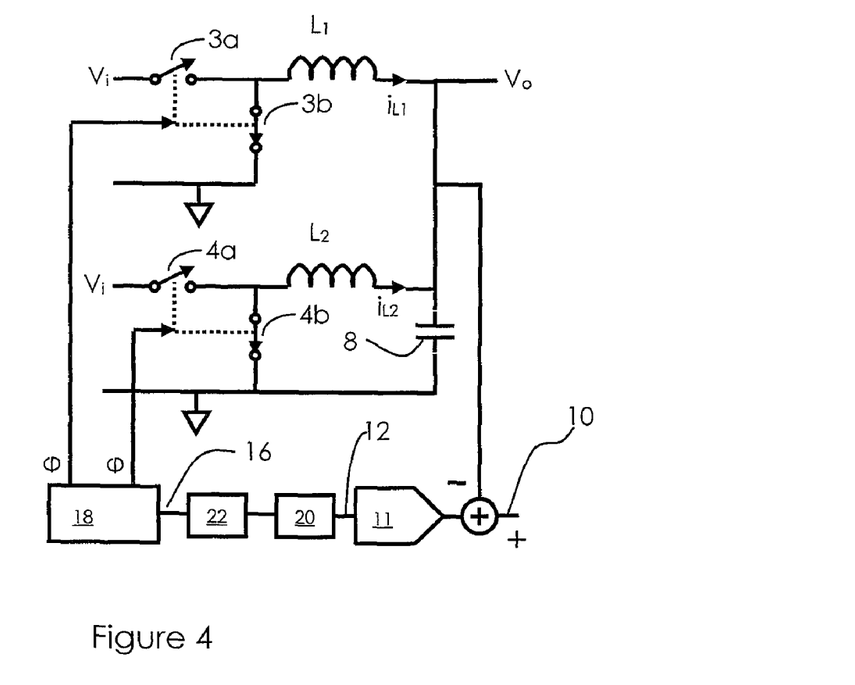
FIG. 4 is a circuit showing an embodiment of the present application.

It will be appreciated that the function above for 2 phases may readily be applied to the general situation of N phases, and that with N phases rejection of the frequency component at $f_s/N$ is required, where $f_s$ is the sampling speed of the converter ADC as shown in FIG. 4.

Figure 5:
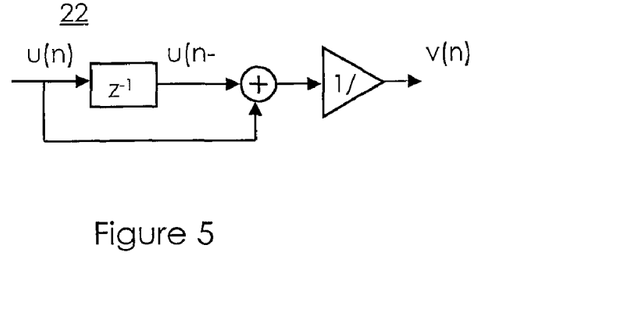
FIG. 5 is a an exemplary response of a filter suitable for use in the circuit of FIG. 4.

A practical implementation of the digital filter, may be achieved by a moving average of the present and past sample. FIG. 5 shows an exemplary implementation, which corresponds to the following z-domain transfer function:

$$\frac{v(z)}{u(z)} = \frac{(z+1)}{2z} \quad (1)$$

Figure 7:
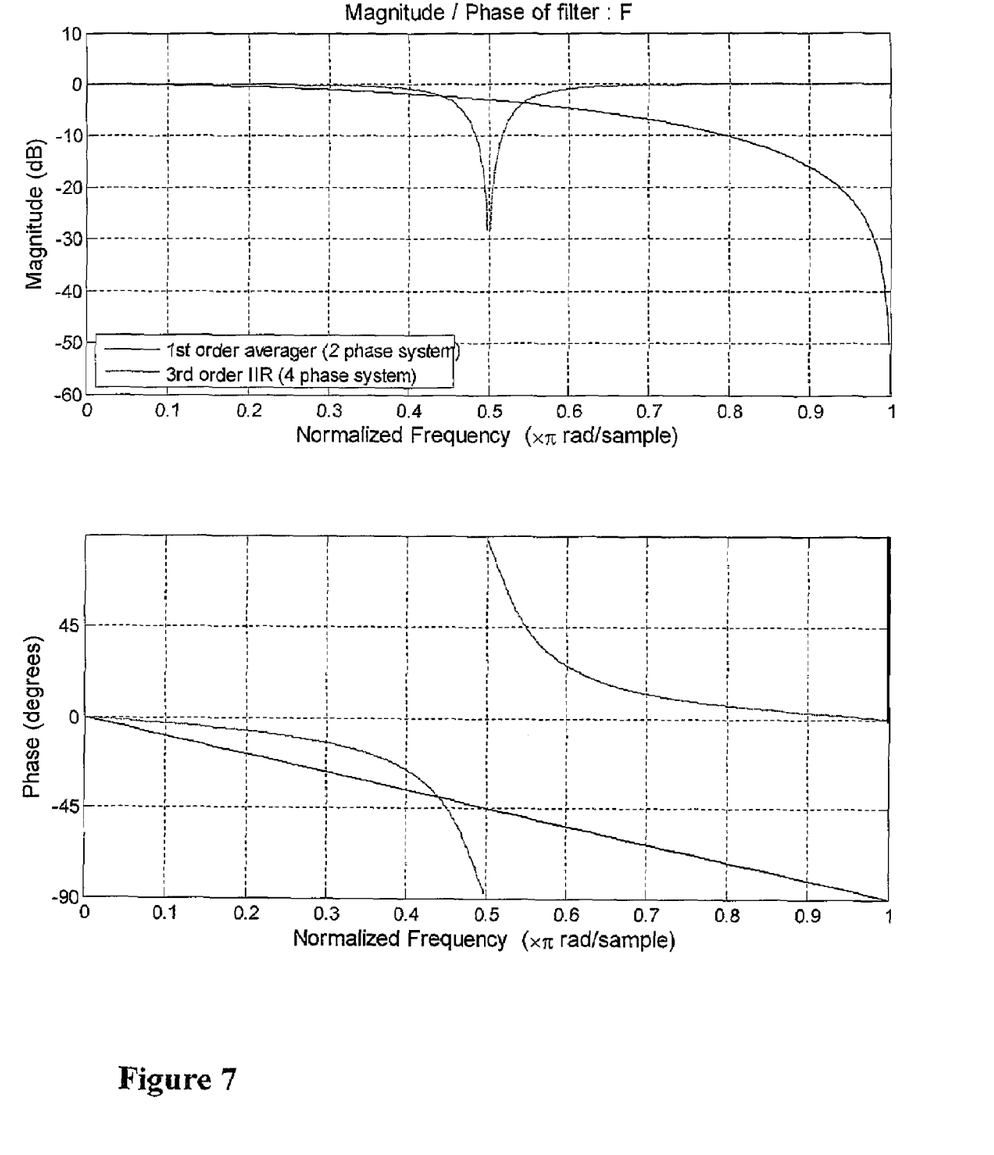
FIG. 7 are gain and phase plots for the filter of FIG. 5 and another filter.
Figure 8:
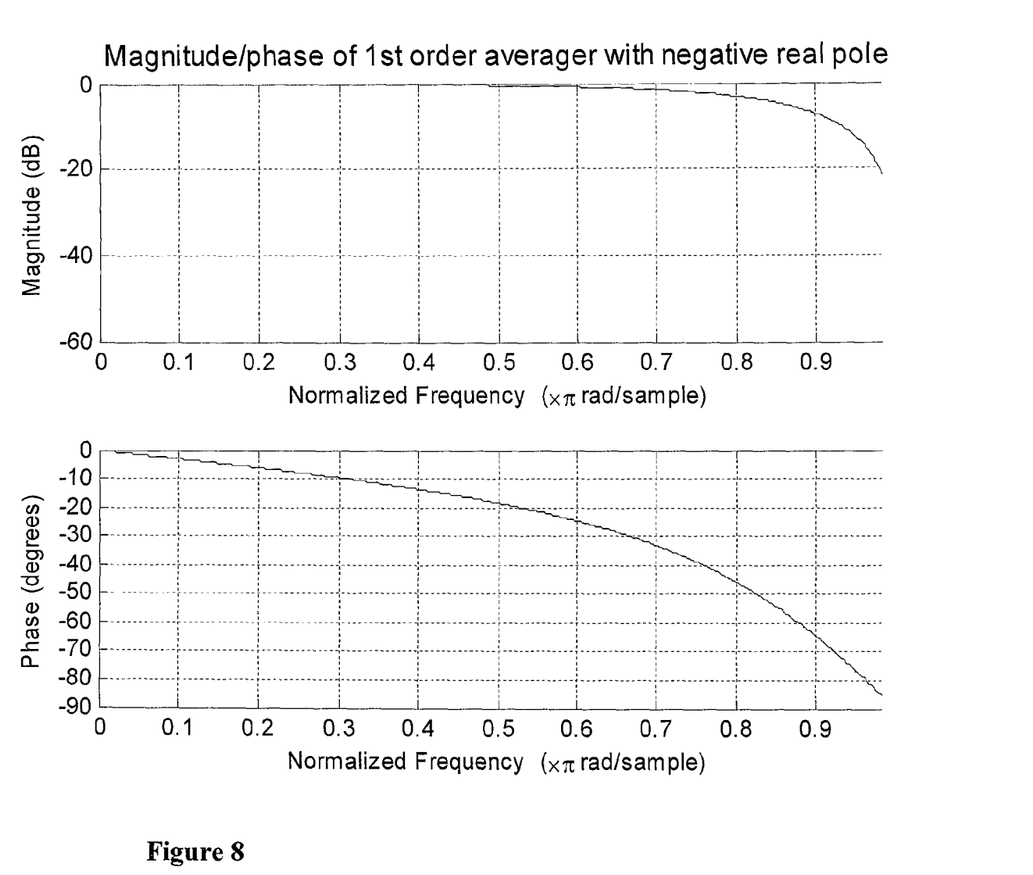
FIG. 8 is a gain and phase plots for a further filter.

This is also known as a first order Sinc filter, and its magnitude and phase response are illustrated in FIG. 7 (full line), where a normalized frequency of one corresponds to $f_s/2$. Notice that at the typical loop crossover frequency of $f_s/10$, which corresponds to a normalized frequency of 0.2 in FIG. 7, the magnitude of the signal through the filter is virtually unaffected but the phase is −18 degrees. This would detract 18 degrees from the phase margin of the final system, and corresponds to the time delay seen in FIG. 6. Whilst this can be compensated for, it is also possible to have less phase-lag by introducing a pole into the filter as follows:

$$\frac{v(z)}{u(z)} = 0.75 \frac{(z+1)}{(z+0.5)} \quad (2)$$

with the corresponding magnitude and phase shown in FIG. 8. Notice that the phase lag at a normalized frequency of 0.2 is now only 6 degrees, which is easily compensated for. The notch is virtually unaffected in magnitude. More sophisticated notch filtering can reduce phase-lag even further, to as little as 3 degrees if required.

Increasing the sinc filter length to a $3^{rd}$ order design places a notch at $f_s/4$, as required for a 4 phase DC-DC converter, however the corresponding phase lag of 54 degrees at a normalized frequency of 0.2 is undesirable.

Using IIR (infinite impulse response) design techniques (such as the bilinear transform method) allows a more acceptable phase response. For example, implementing the IIR filter of equation (3) yields a phase lag at a normalized frequency of 0.2 of only 6 degrees (dashed line of FIG. 7), which makes this filter suitable for a 4 phase DC-DC converter. This may be implemented using a standard IIR second order section. The IIR and averager may also be cascaded for added rejection and filtering.

$$F(z) = 0.8633 \cdot \frac{z^2 + 1}{z^2 + 0.7625} \quad (3)$$

Although up to now we have shown the notch filter following the compensator for simplicity, in a practical system they may be combined. Consider a typical compensator as shown in equation (4). The first term is typical of PID (proportionalintegral-derivative) control, the second term is a noise rejecting lowpass filter which is very typical of practical designs.

$$C(z) = K \frac{(z^2 - b_1 z + b_2)}{z - 1} \cdot \frac{z}{(z^2 + a_1 z + a_2)} \quad (4)$$

The current balancing notch filter also fulfills the function of a lowpass noise rejection filter, and so may be combined with the standard PID control law (resulting in equation (5)), implementing lowpass filtering of noise, and balancing the phase currents. In this way current balancing is achieved virtually for free in terms of circuitry.

$$C(z) = K' \frac{(z^2 - b_1 z + b_2)}{z - 1} \cdot \frac{(z + 1)}{z(z + 0.5)} \quad (5)$$

It is clear from equation (5) that even more sophisticated filtering is possible by an alternative placement of the z=0 pole.

Figure 9:
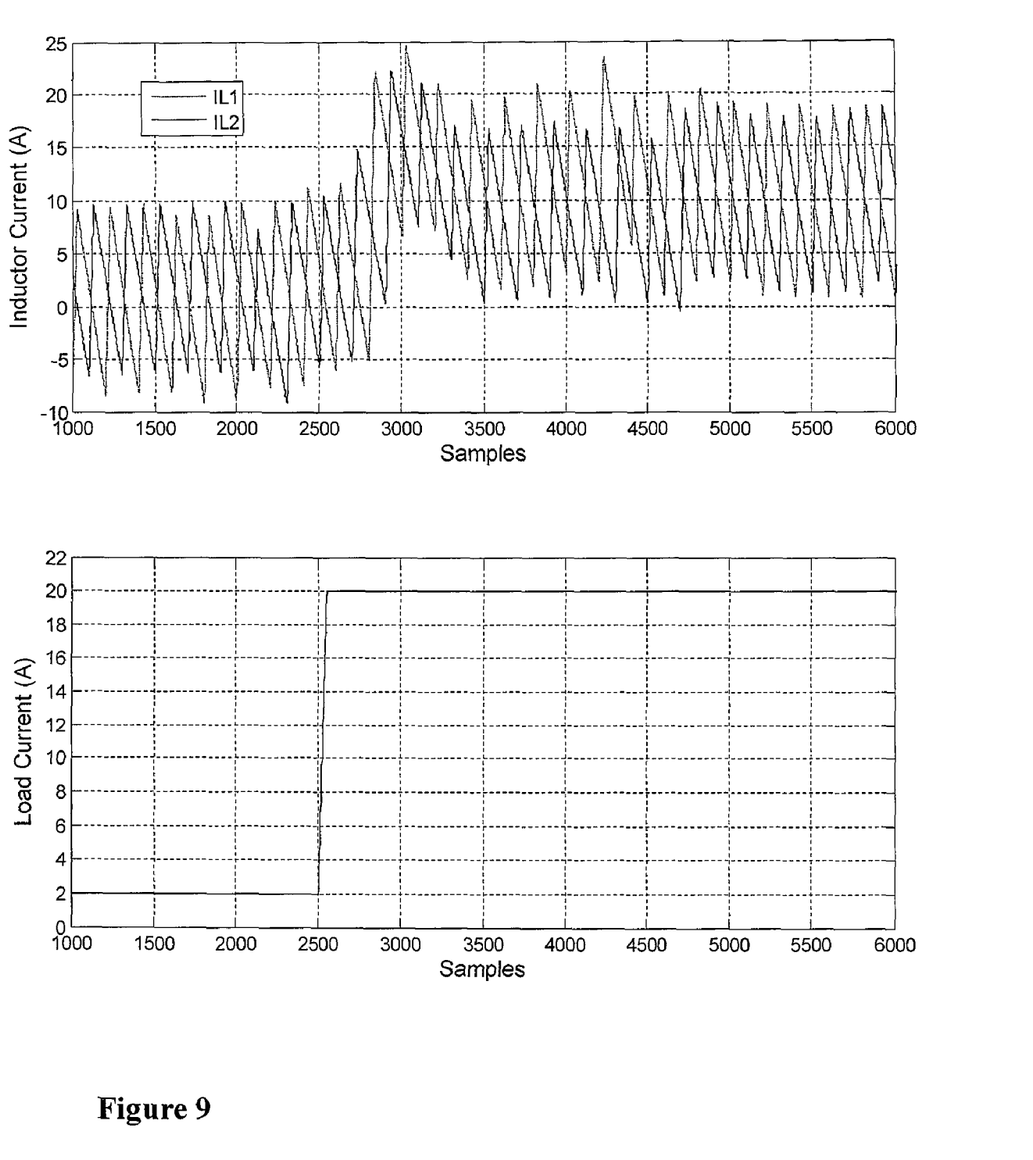
FIG. 9 is a simulated response of the circuit of FIG. 4 to a step input wherein the circuit contains mismatched phase impedances, and FIG. 10 are experimental results for the circuit of FIG. 4

To confirm the efficacy of the described method, a multiphase digital DC-DC converter was simulated using MATLAB/Simulink and PLECS (Piece-wise Linear Electrical Circuit Simulation), incorporating the inherent current balancing method described above. The phase inductors L1, L2 had values of 400 nH and 440 nH respectively, their DCRs were 2.3 mΩ and 2.6 mΩ respectively, the capacitor value C was selected as 600 μF, the switching frequency $f_{sw}$ was set as 250 kHz, the sampling frequency $f_s$ was 500 kHz, the input voltage Vin was set as 12V, and the desired output voltage Vout as 1.5V. The inductor currents shown in FIG. 9 show excellent matching through a step change in load current from 2 to 20 Amps at the 2500 sample point on the horizontal scale.

Experimental Performance

To confirm the simulation results, the multiphase digital DC-DC converter was implemented in hardware with the same parameter values. The hardware comprised of a standard 2-phase buck converter controlled by custom digital control hardware on FPGA which implemented the controller-filter functionality.

Static Performance

Measurements were made without the current balancing enabled in order to determine the basic performance of the system, these results are shown in FIG. 3 and were discussed earlier. In fact, the measurements could not continue beyond 10 Amps because the currents being drawn were far in excess of the 20 Amp design limit of the power stage.

Figure 10:
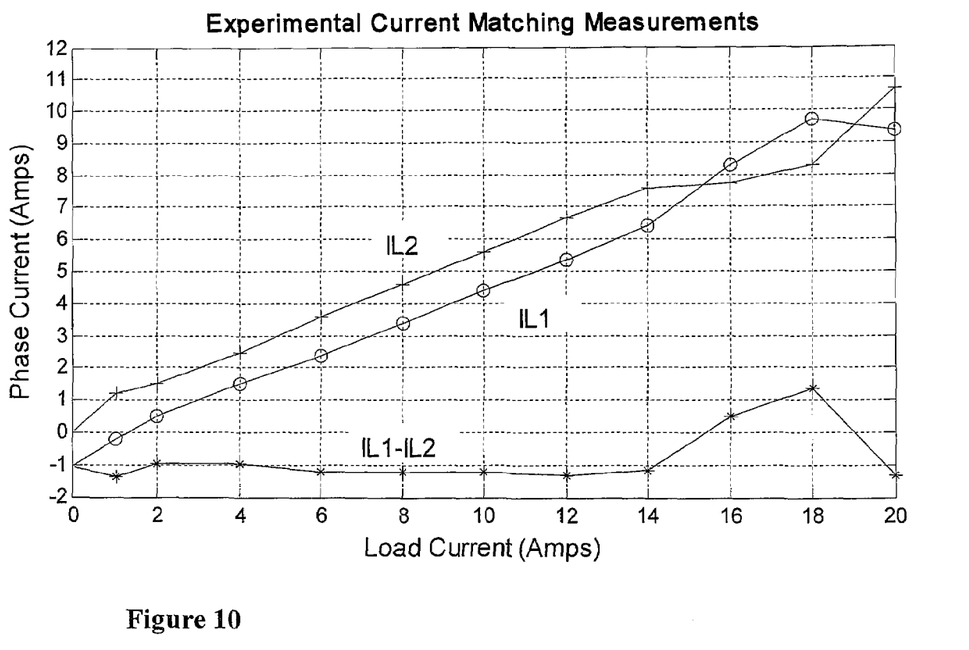

With the current balancing method described herein enabled, FIG. 10 shows that the matching was very good indeed, with the current imbalance never exceeding 1.4 Amps. This shows that passive current balancing by modifying the compensator to include notch filtering is a very effective way to implement current balancing in a practical multiphase buck converter. The MOSFET and driver imbalances were not corrected for in these measurements. Notice that the phase current imbalance "swaps over" between 14 Amps and 16 Amps because the phase currents are not directly controlled and therefore may be subject to dynamic influences such as noise, but nevertheless the duty cycles remain matched and the balancing still holds.

TABLE 1

Experimental Current Measurements

| $I_{load}$ (A) | $I_{L1}$ (A) | $I_{L2}$ (A) | $I_{L1} - I_{L2}$ (A) |
|---|---|---|---|
| 0 | −1.0 | 0.06 | −1.06 |
| 1 | −0.19 | 1.19 | −1.38 |
| 2 | 0.51 | 1.49 | −0.98 |
| 4 | 1.52 | 2.48 | −0.96 |
| 6 | 2.39 | 3.61 | −1.22 |
| 8 | 3.39 | 4.61 | −1.22 |
| 10 | 4.40 | 5.60 | −1.20 |
| 12 | 5.33 | 6.67 | −1.34 |
| 14 | 6.42 | 7.58 | −1.16 |
| 16 | 8.26 | 7.74 | 0.52 |
| 18 | 9.69 | 8.31 | 1.38 |
| 20 | 9.33 | 10.67 | 1.34 |

In order to verify the dynamic performance of the current share method a high performance controller was designed and load steps switching between 2 A and 19 A were applied. Measurements of the basic performance of the controller without current balancing identified that at a mean current under the 19 A load, the first phase was sourcing 21.4 A, whilst the second phase was sourcing −2.13 A. Dynamic matching was also identified as being poor. This poor performance is not uncommon in high performance power converters.

In contrast, when the digital filtering method of duty-cycle matched current balancing described above was employed, measurements of mean currents found that the first phase phase 1 was sourcing 9.46 A, whilst the second phase was sourcing 9.53 A. Dynamic matching was also found to be very good. Although some noise was evident in the measured waveforms this was because of the high control bandwidth of the selected controller and it was clear in any event that the current balancing method dealt very well with this noise. Experiments with a lower performance controller also demonstrated that the inductor currents reacted in tandem to loads step remaining relatively well balanced during the change with a worst case matching measurement of 1.6 A.

Current balancing is important for multi-phase converters to achieve high performance and efficiency. The duty-cycle matching principle of passive current balancing has been explained and justified. It has been shown that, in general, currents are not perfectly equalized using this method, but are balanced so as to minimize the DC power loss.

An advantage of the new digital filtering method of implementing duty-cycle matching is that it does not rely on a current balancing loop and therefore the stability and performance concerns associated with the traditional current balance loop are obviated. Being sensorless, it is insensitive to current measurement inaccuracies caused by noise, component value tolerance or variation. Moreover, it may easily be accommodated in a digital controller. Where it is used to replace the high-frequency noise filter, there is virtually no increase in complexity.

It will be appreciated that the method cannot in itself correct the duty cycle imbalance caused by mismatched driver dead-times and MOSFET switching characteristics, however the performance is extremely good, and such errors may be removed by system calibration if necessary.

The current share scheme has been shown to perform well dynamically, matching currents cycle by cycle during load steps, and clearly benefiting from the absence of the slow current share loop popular in traditional methods. The current share filter proposed, blends well with existing digital controllers and given the very low complexity in implementing the filter, the degree of matching achieved is exceptional.

The invention claimed is:

1. A multi phase switching converter for converting an input voltage to an output voltage, the converter comprising:
a plurality of phases,
   each phase comprising at least one inductor and at least one switch,
   a controller generating a control signal to maintain the output voltage at a desired set point,
   a phase modulator for providing switching signals to the at least one switch of each phase, where
   the duty cycle of the switching signals are responsive to the control signal, and
   a filter for modifying the control signal provided to the phase modulator by rejecting a switching frequency based on the number of phases in the multi phase switching converter.

2. A multi phase switching converter according to claim 1 wherein the converter is a buck converter.

3. A multi phase switching converter according to claim 1 wherein the converter is a synchronous buck converter.

4. A multi phase switching converter according to claim 1, wherein the filter is a notch filter centred on the phase switching frequency.

5. A multi phase switching converter according to claim 1, wherein the filter is a notch filter centred on the phase switching frequency adjusted to include a pole to reduce phase-lag.

6. A multi phase switching converter according to claim 1, wherein the filter is an averaging filter.

7. A multi phase switching converter according to claim 1, where the filter implements a function in the z-domain represented by F(z) and given by $$F(z) = 0.5 \cdot \frac{z+1}{z},$$

where z is a complex variable.

8. A multi phase switching converter according to claim 1, where the filter implements a function in the z-domain represented by F(z) and given by $$F(z) = 0.5 \cdot \frac{z+1}{z},$$

where z is a complex variable.

9. A multi phase controller according to claim 1 wherein the controller and filter are implemented as a single function.

10. A multi phase controller according to claim 9 wherein the single function is of the form in the z-domain represented by C(z) and given by $$C(z) = K' \frac{(z^2 - b_1 z + b_2)}{z-1} \cdot \frac{(z+1)}{z(z+0.5)}$$

where $b_1$ and $b_2$ are controller constants, K' is a controller gain, and z is a complex variable.

11. A method of achieving inherent current balancing between phases in a multi-phase converter having N phases and a digital compensator in a feedback path acting upon an error signal having a sampling rate $f_s$, the method comprising the step of filtering to reject a frequency of $f_s/N$ in the feedback path, wherein the digital compensator generates a control signal based on said filtering to control switching signals in the multi-phase converter.

12. A method according to claim 11, wherein the filtering is performed with a notch filter centred on the phase switching frequency.

13. A method according to claim 12, wherein the notch filter is designed with the inclusion of a pole to reduce phase-lag.

14. A method according to claim 11 wherein the filtering is performed by an averaging filter.

15. A method according to claim 11, where the filtering implements a function in the z-domain represented by F(z) and given by $$F(z) = 0.5 \cdot \frac{z+1}{z},$$

where z is a complex variable.

16. A method according to claim 11, where the filtering implements a function in the z-domain represented by F(z) and given by $$F(z) = 0.75 \frac{(z+1)}{(z+0.5)},$$

where z is a complex variable.

17. A method according to claim 11 wherein the filtering is integrated with a controller.

18. A method according to claim 17 wherein the function of the integrated controller filter in the z-domain is represented by C(z) and is of the form $$C(z) = K' \frac{(z^2 - b_1 z + b_2)}{z-1} \cdot \frac{(z+1)}{z(z+0.5)}$$

where $b_1$ and $b_2$ are controller constants, K' is a controller gain, and z is a complex variable.

19. A digital controller for a multiphase switching converter having N phases, the digital controller comprising:
   a controller unit for generating a control signal in response to acting upon a received error signal having a sample rate $f_s$, and
   a filter for filtering the control signal wherein the filter is configured to reject a frequency of $f_s/N$.

20. A digital controller according to claim 19, wherein the filter is a notch filter.

21. The multi phase switching converter of claim 1, wherein rejecting a switching frequency based on the number of phases in the multi phase switching converter comprises rejecting a frequency of $f_s/N$, where $f_s$ is a sampling rate of an error signal received by the controller and N is the number of phases in the multi phase switching converter.

* * * * *

UNITED STATES PATENT AND TRADEMARK OFFICE
CERTIFICATE OF CORRECTION

PATENT NO. : 8,089,256 B2
APPLICATION NO. : 12/249854
DATED : January 3, 2012
INVENTOR(S) : Anthony Kelly It is certified that error appears in the above-identified patent and that said Letters Patent is hereby corrected as shown below:

COLUMN 7

Claim 8 line 44 delete "$F(z)=0.5\cdot\frac{z-1}{z}$," insert -- $F(z)=0.75\cdot\frac{(z+1)}{(z+0.5)}$, --

Signed and Sealed this
Twenty-eighth Day of February, 2012

David J. Kappos
*Director of the United States Patent and Trademark Office*